2,878,180

HYDROFINING PROCESS AND CATALYST THEREOF

Charles H. Watkins, Western Springs, Ill., assignor to Universal Oil Products Company, Des Plaines, Ill., a corporation of Delaware No Drawing. Application June 21, 1954
Serial No. 438,311

9 Claims. (Cl. 208—216)

This invention relates to a conversion process and more particularly to a conversion process utilizing a novel catalyst.

The catalysts of the present invention are particularly suitable for the treatment of organic compounds and especially of hydrocarbons. Still more particularly these catalysts are of advantage for use in the treatment of gasoline or other hydrocarbon fractions containing undesirable impurities.

The treatment of gasoline or gasoline fractions generally is effected in the presence of hydrogen at temperatures of from about 500° F. to about 800° F., although in some cases higher temperatures up to 850-950° F. may be employed. Atmospheric and preferably superatmospheric pressures ranging from 50 to 5000 pounds per square inch or more may be utilized. This treatment will serve to remove impurities comprising sulfur, nitrogen, oxygen and arsenic from the gasoline or gasoline fraction and thereby is particularly suitable for treatment of gasoline or gasoline fractions prior to the reforming of the gasoline in contact with a reforming catalyst containing a noble or expensive metal in order to avoid the deleterious effects of these impurities on the catalyst. Similarly, the catalyst of the present invention may be used for the treatment of other hydrocarbon fractions in order to remove undesirable impurities as, for example, the treatment of aromatic solvents, kerosene, gas oil, fuel oil, etc.

The catalysts of the present invention may also find utility for other conversion reactions of organic compounds and particularly hydrocarbons, including reforming of gasoline, dehydrogenation of normally gaseous or normally liquid hydrocarbons, isomerization of organic compounds, destructive hydrogenation of hydrocarbons to lower molecular weight compounds, non-destructive hydrogenation of unsaturated hydrocarbons, hydrogen transfer reactions, alkyl transfer reactions, polymerization reactions, etc. Dehydrogenation and reforming reactions generally are effected at temperatures of from about 800° F. to 1200° F. or more, while non-destructive hydrogenation reactions generally are effected at temperatures of from about 300° F. to about 800° F. The various reactions hereinbefore set forth may be effected in the presence of hydrogen when required or of advantage.

The gasoline to be treated in accordance with the present invention may be substantially saturated and thus may comprise straight run gasoline, natural gasoline, etc. or mixtures thereof, or it may be an unsaturated gasoline, such as thermally cracked gasoline, etc., or mixtures of saturated and unsaturated gasolines. The gasoline may be a full boiling range gasoline or any selected fraction thereof, the latter generally referred to as naphtha, and may include higher boiling components and thus have an end boiling point up to 475° F. or higher. Reference to gasoline in the present specification and claims, therefore, is intended to mean a full boiling range gasoline or any fraction thereof including those having components boiling above about 400° F.

In one embodiment the present invention relates to a conversion process which comprises subjecting a hydrocarbon to contact at conversion conditions with a catalyst comprising a refractory oxide, a boron compound, a compound of a metal of the iron group and a compound of molybdenum.

In another embodiment the present invention relates to a process for treating gasoline which comprises subjecting said gasoline to contact in the presence of hydrogen with a catalyst comprising alumina, boron oxide and from about 1% to about 20% by weight each of cobalt compound and molybdenum compound.

In a specific embodiment the present invention relates to a process for removing sulfur, arsenic and nitrogen from gasoline containing the same which comprises subjecting said gasoline to contact at a temperature of from about 500° F. to about 800° F. and a pressure of from about 50 to about 5000 pounds, in the presence of hydrogen in an amount of from about 20 to about 10,000 cubic feet per barrel of gasoline, with a catalyst comprising alumina, boron oxide, and from about 1% to about 20% by weight each of cobalt compound and molybdenum compound.

In a further embodiment the present invention relates to a catalyst comprising alumina, boron oxide, from about 1% to about 20% by weight of a compound of an iron group metal and from about 1% to about 20% by weight of a compound of molybdenum.

In a still further embodiment the present invention relates to a catalyst comprising alumina, a boron compound, halogen, a compound of a metal in the iron group and a compound of molybdenum.

In a further specific embodiment the present invention relates to a method of preparing a catalyst which comprises forming a solution by commingling hydrogen fluoride and boric acid, separately forming an aqueous solution of a water soluble cobalt compound and a water soluble molybdenum compound, commingling said solutions, compositing the resultant solution with alumina and drying and calcining the resultant composite.

In accordance with the present invention the novel catalyst comprises a mixture of components, each component exerting a peculiar influence on the other components. As hereinbefore set forth, gasolines contain different impurities including sulfur compounds, nitrogen compounds, arsenic compounds, etc. While various catalysts have been utilized heretofore for the treatment of gasoline, these catalysts are not entirely satisfactory in that they may be deficient in removing or substantially reducing one or more of the impurities. These disadvantages are overcome by the novel catalyst of the present invention which, due to the peculiar influence of one component on the other, as hereinbefore set forth, results in a catalyst which more properly effects the desired treatment of the gasoline. For example, boron oxide, in combination with the other components appears to modify the other components of the catalyst in effecting the desired removal of nitrogen and arsenic compounds along with the removal of sulfur compounds.

A primary component of the novel catalyst of the present invention comprises a refractory oxide. Alumina is a particularly preferred inorganic refractory oxide because it appears to exert a peculiar influence with the other components of the catalyst. Other inorganic refractory oxides comprise the oxides of zirconium, zinc, titanium, magnesium, thorium, etc. When a halogen is not utilized, or when a halogen which will not react with silica to form a volatile silicon-halogen compound is used, the support may comprise silica. For most catalysts, the inorganic refractory oxide to be used is preferably synthetically prepared and in many cases purified. However, in other cases naturally occurring oxide materials may be satisfactory and thus may comprise naturally occurring clays, diatomaceous earth, feldspar, bauxite, etc., which may be acid or otherwise treated as desired. In some cases the support may comprise a mixture of two or more of the oxides hereinbefore set forth as, for example, composites of the oxides of aluminum and titanium; aluminum and silicon; aluminum and zirconium; aluminum, silicon and zirconium; aluminum and magnesium; aluminum, silicon and magnesium; zinc and zirconium; zinc and magnesium, etc. These multiple component oxide mixtures may be synthetically prepared or naturally occurring as, for example, most naturally occurring clays contain a mixture of components. As hereinbefore set forth, the supports vary in their contribution to the total activity of the catalyst and, therefore, it is understood that the various inorganic oxides or supports which may be employed in accordance with the present invention are not necessarily equivalent.

Synthetically prepared alumina may be manufactured by the reaction of a suitable aluminum salt, such as a chloride of aluminum, a sulfate of aluminum, a nitrate of aluminum, an acetate of aluminum, etc. with a suitable alkaline reagent such as ammonium hydroxide, ammonium carbonate, etc. to precipitate aluminum hydroxide. The aluminum hydroxide may be formed into particles of uniform or irregular size and shape. Usually this entails washing the aluminum hydroxide, drying, forming into particles and calcining the particles. In another embodiment partial washing is effected and the partial drying followed by further washing and further drying of the support. In still another embodiment the aluminum hydroxide may be formed into substantially spherical shaped particles in any suitable manner and then washed and dried.

Other oxides may be prepared in substantially the same manner as hereinbefore set forth in connection with the preparation of alumina with the understanding that suitable modifications in the method of preparation will be made to suit the particular oxides desired. For example, silica gel may be prepared by the acidification of water glass or other suitable alkali metal silicate solutions, and the silica gel may be prepared either in substantially spherical shape by well known means or as wet cakes which are dried and formed into particles of uniform or irregular size and shape.

The wet cakes may be formed into particles of definite size and shape by first drying the wet hydroxide to remove a substantial proportion of the water therefrom and then forming into particles by suitable methods such as grinding, pelleting, extrusion, etc. Drying of the inorganic oxide material may be effected at any suitable temperature which generally will range from about 200° F. to about 600° F. or more and usually for a period of from about 1 to 24 hours or more. When the supporting material is to be calcined, it may be calcined at a temperature which generally will range from about 600° F. to 1400° F. or more, preferably at a temperature of from about 800° F. to about 1200° F. and usually for a period of from about 1 to 12 hours or more. The drying and/or calcination may be effected in the presence of air, a reducing atmosphere such as hydrogen, an inert atmosphere such as nitrogen, or a mixture thereof. In still another embodiment the catalyst may be calcined in a reducing atmosphere and then calcined in an oxidizing atmosphere, or the reverse procedure may be utilized.

As hereinbefore set forth, in one modification the catalyst contains a halogen. In one embodiment the halogen may be added subsequently to the forming of the refractory inorganic oxide or support into particles and either separately or in a commingled state with the other components. Any suitable halogen may be employed and thus may comprise fluorine, chlorine, bromine and/or iodine. The exact state of the halogen in the catalyst has not been established but the halogen is present in a combined state, probably in association with the support and/or other components of the catalyst. The halogen may be added in any suitable manner and, while the halogen may be utilized as such, for ease in handling it may be used as an aqueous solution of a hydrogen halide. In another embodiment when the halogen comprises fluorine, it may be added as an aqueous solution of an ammonium fluoride and particularly as an aqueous solution of ammonium bifluoride. Similarly, when the halogen comprises a halogen other than fluorine it may be added as the ammonium halide thereof as, for example, ammonium chloride, ammonium bromide, etc. In still another embodiment the halogen may be added as a metal halide salt when the salt is sufficiently soluble and the metal is desired in the final catalyst or is not objectionable therein.

When hydrogen fluoride in aqueous solution is added to alumina, heat is evolved due to the reaction of hydrogen fluoride and alumina. This is a disadvantage in that the reaction often becomes violent and precautions accordingly need to be taken or else provision must be made for cooling the reaction mixture. When the catalyst contains fluorine, one of the preferred methods of preparing the alumina-fluoride composite, and which method is one of the particular embodiments of the invention, is as follows: hydrogen fluoride is composited with boric acid and this solution is used to impregnate the alumina. When preparing this solution, it is preferred that the hydrogen fluoride or boric acid be in aqueous solution or both of them may be in aqueous solution and the solutions commingled. It has been found when using a solution to which boric acid and hydrogen fluoride has been added that the fluoride does not react as violently with the alumina, thus affording a better means of control of the reaction. It has also been found that the halogen is much more uniformly distributed throughout the inorganic refractory oxide or alumina component than when alumina is directly commingled with an aqueous solution of hydrogen fluoride.

One theory, although I do not intend my invention to be limited thereto, is that the hydrogen fluoride and boric acid react or, that is, the hydrogen fluoride complexes with boric acid to form a compound which may have the formula $HBF_4$ or its basic derivatives. It is, therefore, this compound which is composited with the alumina, and this compound in turn reacts or associates itself with the alumina. As hereinbefore mentioned, one of the advantages of using this particular method of catalyst preparation is that heat is not evolved at such a rapid rate and thus better control of the reaction is possible. Another advantage is that the halogen, when it is used, and the boron compound are commingled with the alumina in one impregnating operation.

A compound of boron is another essential component of the catalyst, and the catalyst preferably contains from about 0.1% to about 15% by weight of boron oxide (calculated as $B_2O_3$). The boron compound may be introduced into the catalyst composite in any suitable manner and generally may be prepared by adding a suitable compound of boron such as boron oxide, boric acid, etc. to the alumina in either the wet or dry condition, thoroughly mixing the components and then heating until the mixture is dry. In one method the boric acid solution is added to precipitated alumina and then the mixture is thoroughly mixed and finally heated. In an alternative method, salts such as aluminum chloride hexahydrate, which decompose on heating to form the corresponding oxide, are intimately mixed with boric acid solution and the mixture heated until the salt is decomposed to form the oxide. In another embodiment boric anhydride, boric acid or a perborate may be dissolved in water and then commingled with alumina, and an alkaline precipitant, such as ammonium hydroxide, is added to precipitate the component, after which the precipitate is filtered, washed and dried. The alumina-boron oxide composite may be formed into particles of definite size and shape in the manner herein set forth for alumina.

The exact compound of boron that is present in the catalyst has not been definitely established, but it appears that the boron is present as boron oxide, $B_2O_3$. The boron, however, also appears to be in some sort of a chemical combination or physical association with the other components, for example, it may be associated in some manner with the alumina. Reference to boron oxide in the specification and claims is, therefore, intended to include $B_2O_3$ as well as other modifications of boron as it exists in the catalyst.

As hereinbefore mentioned, a preferred method of introducing boron into the catalyst, when fluorine is to be a component of the catalyst, is to form a separate solution of boric acid and hydrogen fluoride and to impregnate the alumina with the solution. The advantages of using this method have been mentioned. When impregnating or commingling the alumina with the solution containing boric acid and hydrogen fluoride, other components of the catalyst may be present in the solution. Therefore, the molybdenum compound and/or cobalt compound may be present in the solution containing the hydrogen fluoride and boric acid and all of the components of the catalyst commingled in one operation. However, the catalyst may also be prepared by impregnating the catalyst with individual or separate solutions containing the individual elements.

The cobalt containing and the molybdenum containing components may be added to the catalyst composite in any suitable manner. When successive precipitation methods are employed, the refractory oxide is precipitated as hereinbefore set forth and then the wet slurry, either with or without prior washing, may be composited with salts or other compounds of the other components. This resultant composite may then be dried, formed into particles and calcined.

In separate precipitation methods the alumina is formed, as hereinbefore set forth, and, either before or after the boron compound is commingled with the alumina, the cobalt and molybdenum compounds are intimately mixed with the alumina, preferably in a wet state.

In a preferred embodiment of the present invention the molybdenum is introduced into the catalyst by means of an impregnating solution containing a molybdenum compound. Molybdic acid is a particularly suitable molybdenum containing compound to be used since it readily decomposes upon heating and is available commercially. While molybdic acid is a preferred source of molybdenum, it is understood that any other suitable source of molybdenum may be employed. For example, molybdenum oxides and particularly molybdenum trioxide may be used. Molybdic acid is not very soluble in water and, therefore, it may be desirable to add an acid to aid in effecting solution of the molybdic acid. Molybdic acid may be made to enter into solution by the addition of a strong mineral acid such as nitric acid or by the addition of some organic acids to the slurry of molybdic acid in water. Further, salts of other components as, for example, cobalt nitrate may be composited with the impregnating solution and still not encounter precipitation of solids.

Other acids include hydrochloric acid, hydroiodic acid, hydrobromic acid, hydrofluoric acid, phosphoric acid, sulfuric acid, etc. A mixture of two or more mineral acids may be employed. The boric acid may be added to the strong mineral acid and, in a preferred embodiment of the invention as hereinbefore mentioned, boric acid and hydrofluoric acid are commingled together and this mixture of the acids may be used to solubilize the molybdic acid. The concentration of the acids will be selected so that the molybdenum compound and, when employed, other metal compound or compounds, will be in homogeneous solution and will remain as a stable solution for sufficient time to permit ready impregnation of the solution with the support.

It is understood that the water to be supplied to the system may be introduced, all or in part, with the various components and generally will be introduced as the water used in forming solutions of the various components for ease in handling. Any additional water which may be required may be introduced into the system at any step of the preparation.

The cobalt compound may be introduced or combined with the alumina simultaneously with the molybdenum compound or else a separate impregnation step may be used. A particularly preferred salt of cobalt comprises cobalt nitrate. Other soluble salts of cobalt include cobalt ammonium nitrate, cobalt ammonium chloride, cobalt ammonium sulfate, cobalt bromate, cobalt bromide, cobalt chloride, cobalt chlorate, cobalt fluosilicate, cobalt iodide, cobalt potassium sulfate, etc. Although a cobalt compound is particularly preferred, compounds of other metals of the iron group may be used but not necessarily with equivalent results. These include compounds of iron and nickel and these compounds may be introduced by using the same types of compounds hereinbefore specified for cobalt.

The impregnating mixture may be prepared in any suitable manner. In one method a mixture of boric acid and mineral acid in the desired proportions is made and the molybdenum compound dissolved therein, followed by the addition of other metal compound or compounds when employed. In another method all or a portion of the molybdic acid may be dissolved in one acid and then the other acid is added, preferably in incremental proportions either before or after all of the molybdic acid has been introduced. When employed the other metal compound or compounds may be introduced into the mixture, preferably in incremental proportions, and the additional acid introduced during or after the addition of the other metal compound or compounds. In still another embodiment the molybdic acid is added to the mixture after the other metal compound or compounds have been dissolved in the acid or acids. It is understood that any suitable method of forming the homogeneous mixture may be employed, and in the event that difficulty is encountered in obtaining a homogeneous solution, the mixture may be heated, which generally will not require a temperature in excess of about 200° F.

The concentration of molybdenum compound and other metal compounds will be selected so that the final composite contains these components in the desired proportions and may vary from one part of one component to twenty parts or more of the other components. In a preferred catalyst comprising alumina, molybdenum oxide, cobalt oxide and boron oxide, the support or alumina comprises a major portion of the catalyst and the molybdenum oxide (calculated as Mo) and the cobalt oxide (calculated as Co) each may comprise from about 1% to 20% by weight of the final composite. The atomic proportions of molybdenum (Mo) to cobalt (Co) may be equal or may range up to 20 or more atomic proportions of one component to one atomic proportion of the other. In a particularly preferred catalyst comprising alumina, boron oxide, molybdenum oxide and cobalt oxide, the alumina comprises a major proportion of the composite and may range from about 50% to about 95% by weight of the final catalyst, the molybdenum being present in a concentration of from about 5% to about 10% by weight and the cobalt being present in a concentration of from about 0.5% to about 5% by weight. Other catalysts may contain the molybdenum compound and the cobalt compound in amounts which fall within the larger ranges hereinbefore mentioned. In still another embodiment the composite contains combined halogen and halogen may be present in a concentration from about 0.01% to about 20% or more by weight of the final catalyst and preferably is present in a concentration of from about 0.1% to about 10% by weight.

The impregnating solution or solutions as prepared in the above manner may be composited with the support in any suitable manner. As hereinbefore set forth, the support is prepared as preformed particles which are dried and/or calcined prior to compositing with the impregnation solution. In one embodiment, preformed particles of the support are dipped, soaked, immersed, suspended, etc., in the impregnation solution, excess solution is drained or otherwise removed from the particles, and the oxides developed by heating, preferably in the presence of air. Preferably the excess solution is reused in the interest of economy, and it may be reused as such or commingled with fresh solution and utilized for further impregnation of preformed support particles. It is understood that any suitable method of compositing the impregnating solution with the preformed particles of the support may be employed and that the mixing and working of these preparations may be effected at ambient or elevated temperatures, which temperatures generally will not be above about 200° F.

In another preferred embodiment the catalyst comprises a support and particularly alumina, boron oxide, molybdenum sulfide and cobalt sulfide and such a composite may also contain halogen. This catalyst is readily obtained by sulfiding the composite containing the oxides. The sulfiding may be accomplished in any suitable manner. In one method the sulfiding may be effected by passing hydrogen sulfide through the composite, preferably at an elevated temperature, which may range from about 500° F. to about 1000° F. or more for a time sufficient to effect substantially complete sulfidation, which can be determined by continuing the treatment until there is not further absorption of hydrogen sulfide. In another embodiment, the composite containing the oxides may be utilized at an elevated temperature for the treatment of a hydrocarbon or other fraction, particularly a gasoline fraction, containing sulfur compounds, and thereby convert the oxides to the sulfides in situ.

Although the catalyst of the present invention will have a long life, it may be necessary to regenerate the catalyst after long periods of service. The regeneration may be effected by treatment with air or other oxygen-containing gas to burn the carbonaceous deposit therefrom and oxidize the catalyst components and/or other modifications thereof. In general, it is preferred to control the regeneration temperature not to exceed about 1200° F. In some cases it may be desirable to follow the burning operation with a treatment of hydrogen-containing gas at a temperature of from about 700° F. to about 1100° F. or the reverse procedure may be used.

As hereinbefore set forth, while the catalysts of the present invention are particularly suitable for the treatment of gasoline, it is understood that these catalysts will also find utility in other conversion reactions including the dehydrogenation of normally gaseous and normally liquid hydrocarbons, cyclization of aliphatic hydrocarbons containing six or more carbon atoms in straight chain arrangement, isomerization reactions and particularly the isomerization of olefinic, paraffinic, alkyl aromatic and naphthenic hydrocarbons, isomerization of acids, alcohols, ethers, etc., alkyl transfer reactions, hydrogenation of unsaturated hydrocarbons, including olefins and aromatics, unsaturated acids, alcohols, ethers, etc., hydrogen transfer reactions, hydrocracking of higher boiling oils to lower boiling materials including the hydrocracking of gas oil to form gasoline, alkylation reactions, polymerization reactions, etc., as well as desulfurization and other purification of higher boiling oils, including kerosene, gas oil, lube oil, etc.

As hereinbefore set forth, these catalysts are particularly suitable for use in the treatment of gasoline or fractions thereof. This treatment is generally effected at temperatures of from about 500° F. to about 800° F., although in some cases, higher temperatures up to 850–900° F. may be employed. Atmospheric and preferably superatmospheric pressure ranging from 50 to 5000 lbs. or more per square inch may be utilized. The pre-treatment preferably is effected in the presence of hydrogen, which may be introduced from an extraneous source or recycled within the process. The concentration of hydrogen will vary with the concentration of sulfur compounds, nitrogen compounds and other impurities contained in the gasoline and also on whether the gasoline is a saturated or unsaturated gasoline. The amount of hydrogen may range from about 20 to 10,000 or more cubic feet per barrel of gasoline. In general, greater concentrations of hydrogen will be used when treating cracked gasoline in order to also hydrogenate the olefins contained therein and thereby produce a substantially saturated gasoline to be used as charging stock to the reforming process, and in such cases up to 25,000 cubic feet of hydrogen per barrel of gasoline or even more may be employed. When using a large concentration of hydrogen, it is generally preferred to recycle the hydrogen gas within the process. The impurity content of the gas stream being recycled in such cases will be small in comparison to the hydrogen content thereof, and the gas stream may be recycled with little or only a light treatment to purify the gas stream to remove the impurities.

Another embodiment of the invention comprises a combination process in which gasoline is subjected to pre-treatment in a manner hereinbefore set forth, and the treated gasoline is subjected to reforming in the presence of a catalyst containing a noble metal in the manner hereinafter set forth. A particular advantage to this combination process is that the reforming operation will produce an excess of hydrogen over that required in a combination process wherein the steps are mutually interdependent, the first step providing an improved charging stock for the second step and the second step providing hydrogen for use in the first step.

The reforming process generally is effected at a temperature of from about 700° F. to 1100° F. or more, a pressure within the range of from about 50 to 3000 lbs. per square inch or more, and a weight hourly space velocity (defined as the weight of oil per hour per weight of catalyst in the reaction zone) of from about 0.1 to about 20 or more. The reforming preferably is effected in the presence of hydrogen, which may be introduced from an extraneous source or recycled from within the process. In a preferred operation, sufficient hydrogen will be produced in the reforming operation to furnish the hydrogen required in the process and, therefore, it may be unnecessary to introduce hydrogen from an extraneous source. In general the concentration of hydrogen in the reaction zone will be within the range of from about 0.5 to 20 mols or more of hydrogen per mol of hydrocarbon. Any suitable reforming catalyst may be employed and, as hereinbefore set forth, the pre-treatment of the gasoline is particularly advantageous when the reforming catalyst contains a noble or expensive metal including platinum, rhodium, ruthenium, osmium, iridium, silver, gold, etc. A particularly preferred catalyst comprising alumina, from about 0.01% to about 10% by weight of platinum and from about 0.1% to about 10% by weight of halogen.

Non-destructive hydrogenation reactions generally are effected at lower temperatures, and may range from about 100° F. to about 600° F. and generally at pressures ranging from 50 to 5000 pounds or more. The other reactions similarly will be effected at the specific conditions best suited to accomplish the desired conversion.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products.

As hereinbefore set forth, the hydrogen may be recycled for further use in the process. Other suitable units in which the process may be effected include the fluidized type process in which the hydrocarbons and catalyst are maintained in a state of turbulence under hindered settling conditions in a reaction zone, the fluidized-fixed bed type process in which the reaction is effected in a manner similar to the fluidized type process but the catalyst is not withdrawn from the reaction zone as in the fluidized type process, the compact moving bed type in which the catalyst and hydrocarbons are passed either concurrently or countercurrently to each other, and the suspensoid type of operation in which the catalyst is carried into a reaction zone as a slurry in the hydrocarbon oil.

In one embodiment the effluent gas from the pre-treating step may be treated to separate hydrogen from hydrogen sulfide, ammonia, etc., and the resultant hydrogen may be utilized in either the pre-treating or reforming steps of the process. In another embodiment the effluent gas from the pre-treating step may be continuously or intermittently withdrawn from the process and, in this manner the objectionable sulfur, nitrogen, or other compounds are removed from the process in the form of hydrogen sulfide, ammonia, etc.

The following examples are introduced to illustrate further the novelty and utility of the present invention, but not with the intention of unduly limiting the same.

EXAMPLE I

A catalyst was prepared containing alumina and approximately 7.0% by weight of combined fluorine (calculated as F), 6.3% by weight of molybdenum (calculated as Mo), 1.3% by weight of cobalt (calculated as Co) and 2.9% by weight of boron oxide (calculated as $B_2O_3$). This catalyst was prepared as follows: 12.4 grams of molybdic acid (commercial C. P., 85% $MoO_3$) were slurried in 15 ml. of water. 16 grams of 50% hydrofluoric acid was added to the solution and the molybdic acid dissolved. 7.3 grams of cobalt nitrate hexahydrate, $Co(NO_3)_2 \cdot 6H_2O$, were added to the molybdic acid-hydrofluoric acid solution and dissolved. Water was added to the solution to make up a resultant volume of 45 ml. Boric acid ($H_3BO_3$) was added in amount to saturate the solution. The solution was decanted from the excess boric acid, and more water was added to make 55 ml. of solution.

Alumina pills were prepared by commingling ammonium hydroxide with aluminum chloride to form aluminum hydroxide. The aluminum hydroxide was thoroughly washed and filtered and then dried, formed into cylindrical pills and calcined at a temperature of about 1200° F.

The molybdic acid-cobalt nitrate-hydrofluoric acid-boric acid solution was added to 100 grams of the alumina pills, the excess solution was drained, the pills were dried at 220° F. for 16 hours and calcined in air at 800° F. for 2 hours.

When the solution was added to the alumina, the heat of reaction was negligible and no excess impregnating solution was needed to take up heat. This catalyst was designated catalyst A.

EXAMPLE II

A catalyst containing alumina and approximately 0.71% by weight of boron oxide, 0.96% by weight of cobalt, 5.39% by weight of molybdenum and 2.0% by weight of fluorine was prepared as follows: 4.3 grams of boric acid were dissolved in 75 ml. of water. 50 ml. of this solution were used to slurry 11.8 grams of molybdic acid (85% $MoO_3$). Solution was effected by adding 5 ml. of 50% hydrofluoric acid. 6.4 grams of cobalt nitrate hexahydrate were added and the solution volume made up to 55 ml.

Alumina pills were prepared as outlined in Example I, and the solution was impregnated into 100 grams of alumina pills. The pills were dried for 11 hours at 220° F. and calcined in air at 800° F. for 2 hours. This catalyst was designated catalyst B.

EXAMPLE III

A catalyst containing alumina and approximately 5.9% by weight of molybdenum and 1.15% by weight of cobalt was prepared as follows: A stock solution was prepared by dissolving 35.4 grams of molybdic acid (85% $MoO_3$) and 19.2 grams of cobalt nitrate hexahydrate in a solution of 15 ml. of 14% nitric acid and 80 ml. of water. The solution was made up to 120 ml. by the addition of water. 75 ml. of the impregnating solution was used to impregnate 50 grams of alumina pills. The pills were dried for 16 hours at 220° F. and calcining the 800° F. for 2 hours. This catalyst was designated catalyst C.

EXAMPLE IV

The catalysts as prepared in the above examples were utilized for the hydrodesulfurization of a heavy California cracked naphtha. This heavy naphtha had a A. P. I. gravity at 60° F. of 46.8, a bromine number of 66.8, a sulfur content of 1.35% by weight, a basic nitrogen number of 209 and a boiling range of from 222° F. to 419° F. This naphtha was subjected to treatment with each of the catalysts at a temperature of about 700° F., a pressure of 800 pounds per square inch, a liquid hourly space velocity (defined as the volumes of oil per hour per volume of catalyst in the reaction zone) of 10 and in the presence of hydrogen in the amount of 2000 cubic feet per barrel of oil. The effluent was collected and analysis were made. The results of the analysis are tabulated below in the table.

Table

| | Percent of sulfur removal | Percent of bromine no. reduction | Percent of basic nitrogen reduction |
|---|---|---|---|
| Catalyst A | 91 | 81 | 73 |
| Catalyst B | 94 | 87 | 79 |
| Catalyst C | 87 | 76 | 66 |

These results illustrate that the incorporation of boron oxide into the catalyst produces a catalyst of better desulfurization activity for the treatment of a gasoline fraction. The examples also illustrate that the catalyst prepared according to the steps as outlined in the specification are very active catalysts, and the method affords a means of better controlling the impregnation of the catalyst.

I claim as my invention:

1. A process for removing sulfur from hydrocarbon distillate containing the same which comprises subjecting said distillate to contact at a temperature of from about 500° F. to about 800° F. and a pressure of from about 50 to about 5000 pounds, in the presence of hydrogen in an amount of from about 20 to about 10,000 cubic feet per barrel of distillate, with a catalyst comprising alumina, boron oxide and from about 1% to about 20% by weight each of cobalt compound and molybdenum compound.

2. The process of claim 1 further characterized in that said cobalt compound and said molybdenum compound are oxides.

3. The process of claim 1 further characterized in that said cobalt compound and said molybdenum compound are sulfides 4. The process of claim 1 further characterized in that said catalyst also contains a halogen.

5. A hydrocarbon desulfurizing catalyst comprising alumina, boron oxide and from about 1% to about 20% by weight each of cobalt compound and molybdenum compound.

6. The catalyst of claim 5 further characterized in that said cobalt compound and said molybdenum compound are oxides.

7. The catalyst of claim 5 further characterized in that said cobalt compound and said molybdenum compound are sulfides.

8. The catalyst of claim 5 further characterized in that said catalyst also contains from about 0.1% to about 10% by weight of halogen.

9. A process for removing sulfur, arsenic and nitrogen from gasoline containing the same which comprises subjecting said gasoline to contact at a temperature of from about 500° F. to about 800° F. and a pressure of from about 50 to about 5000 pounds, in the presence of hydrogen in an amount of from about 20 to about 10,000 cubic feet per barrel of gasoline, with a catalyst comprising alumina, boron oxide and from about 1% to about 20% by weight each of cobalt compound and molybdenum compound.

References Cited in the file of this patent

UNITED STATES PATENTS

| | | |
|---|---|---|
| 2,398,175 | Cole | Apr. 9, 1946 |
| 2,407,052 | Bailey et al. | Sept. 3, 1946 |
| 2,407,918 | Burgin | Sept. 17, 1946 |
| 2,446,619 | Stewart | Aug. 10, 1948 |
| 2,486,361 | Nahin et al. | Oct. 25, 1949 |
| 2,499,255 | Parker | Feb. 28, 1950 |
| 2,547,380 | Fleck | Apr. 3, 1951 |
| 2,562,989 | Naragon | Aug. 7, 1951 |
| 2,636,845 | Richardson et al. | Apr. 28, 1953 |
| 2,687,381 | Henrick | Aug. 24, 1954 |
| 2,697,064 | Brown | Dec. 14, 1954 |
| 2,760,907 | Attane et al. | Aug. 28, 1956 |